United States Patent
Qiu et al.

(10) Patent No.: US 10,811,913 B2
(45) Date of Patent: Oct. 20, 2020

(54) WIRELESS CHARGING SYSTEM WITH MULTIPLE COMMUNICATIONS MODES

(71) Applicant: Apple Inc., Cupertino, CA (US)

(72) Inventors: Weihong Qiu, San Ramon, CA (US); Nan Liu, Sunnyvale, CA (US); Dmitry Berdnikov, San Jose, CA (US); Zaki Moussaoui, San Carlos, CA (US); Rex Huang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 16/196,975

(22) Filed: Nov. 20, 2018

(65) Prior Publication Data

US 2020/0044491 A1 Feb. 6, 2020

Related U.S. Application Data

(60) Provisional application No. 62/715,167, filed on Aug. 6, 2018.

(51) Int. Cl.
| | |
|---|---|
| *H02J 7/00* | (2006.01) |
| *H02J 50/80* | (2016.01) |
| *H02J 7/02* | (2016.01) |
| *H02J 50/40* | (2016.01) |
| *H02J 50/12* | (2016.01) |
| *H04B 5/00* | (2006.01) |
| *H02M 7/06* | (2006.01) |

(52) U.S. Cl.
CPC ............. *H02J 50/80* (2016.02); *H02J 7/025* (2013.01); *H02J 50/12* (2016.02); *H02J 50/40* (2016.02); *H02M 7/06* (2013.01); *H04B 5/0037* (2013.01)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | |
|---|---|---|
| 9,112,364 B2 | 8/2015 | Partovi |
| 9,667,322 B2 | 5/2017 | Walley |
| 9,806,555 B2 | 10/2017 | Li et al. |

(Continued)

FOREIGN PATENT DOCUMENTS

| | | |
|---|---|---|
| CN | 108075579 A | 5/2018 |
| WO | 2016108949 A1 | 7/2016 |

*Primary Examiner* — Arun C Williams
(74) *Attorney, Agent, or Firm* — Treyz Law Group, P.C.; Jason Tsai

(57) ABSTRACT

A wireless power transmission system has a wireless power receiving device that can be charged using multiple different types of wireless power transmitting devices. The different types of wireless power transmitting devices have power transmitting coils that exhibit different levels of magnetic coupling with the power receiving coil of the wireless power receiving device. The wireless power receiving device may include capacitors, resistors, and/or other loading circuits that can be independently switched into use depending on the level of magnetic coupling that is detected, on a rectified voltage level, on the size of the output load, and/or on information conveyed during handshaking operations to present a desired impedance adjustment at the power receiving coil so that data signal can be properly conveyed between the power receiving device and the power transmitting device.

28 Claims, 12 Drawing Sheets

(56) References Cited

U.S. PATENT DOCUMENTS

| | | |
|---|---|---|
| 9,912,198 B2 | 3/2018 | Bae |
| 10,003,212 B2 | 6/2018 | Jeong et al. |
| 10,128,696 B2 | 11/2018 | Iwasaki |
| 10,186,760 B2 | 1/2019 | Heppell |
| 10,343,537 B2 | 7/2019 | Widmer et al. |
| 2007/0103110 A1* | 5/2007 | Sagoo ................. H02J 50/10 320/109 |
| 2013/0154385 A1 | 6/2013 | Miwa et al. |
| 2016/0190855 A1* | 6/2016 | Katabi ................. H02J 50/12 320/108 |
| 2017/0018954 A1 | 1/2017 | Lee et al. |
| 2017/0126283 A1 | 5/2017 | Rehm |
| 2018/0351414 A1 | 12/2018 | Park |

\* cited by examiner

WIRELESS CHARGING SYSTEM WITH MULTIPLE COMMUNICATIONS MODES

This application claims the benefit of provisional patent application No. 62/715,167, filed Aug. 6, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to wireless power receiving device such as a portable electronic device. The portable electronic device receives the wirelessly transmitted power and uses this power to charge an internal battery or to power the device.

It may sometimes be desirable to transmit data from the wireless power receiving device to the wireless power transmitting device. So-called "in-band" communications schemes have been developed that allow wireless power receiving devices to communicate with wireless power transmitting devices. In a typical in-band communications scheme, a switching circuit that is coupled to a coil in the wireless power receiving device is used to modulate the load across the coil. The wireless power transmitting device will attempt to detect the modulated signal using a sensing circuit coupled to a coil in the wireless power transmitting device.

Sometimes, however, changing the load across the coil at the wireless power receiving device does not necessarily translate to a sufficiently detectable amplitude or phase change at the sensing circuit of the wireless power transmitting device.

SUMMARY

A wireless power transmission system has a wireless power receiving device that can be charged either using a first wireless power transmitting device having a first coil configuration or a second wireless power transmitting device having a second coil configuration that is different than the first coil configuration. The wireless power receiving device may include a wireless power receiving coil, wireless power receiving circuitry coupled to the wireless power receiving coil, and control circuitry operable to: (1) configure the wireless power receiving device in a first data communications (or transmission) mode when a first magnetic coupling coefficient is present between the wireless power receiving coil and the first coil configuration of the first wireless power transmitting device and (2) configure the wireless power receiving device in a second data communications (or transmission) mode when a second magnetic coupling coefficient is present between the wireless power receiving coil and the second coil configuration of the second wireless power transmitting device.

The wireless power receiving device may further include a first switching capacitor (or resistor) that is coupled to a first end of the wireless power receiving coil and a second switching capacitor (or resistor) that is also coupled to the first end of the coil. The first switching capacitor is selectively activated only during the first data communications mode but not during the second data communications mode. The second switching capacitor is selectively activated only during the second data communications mode but not during the first data communications mode. There is no switching capacitor is coupled to the second end of the wireless power receiving coil. The first and second switching capacitors have substantially different capacitance values. The wireless power receiving device may further include rectifier circuitry coupled to the wireless power receiving circuitry. The rectifier circuitry is operable in a full-bridge rectifier mode during the first data communications mode and in a half-bridge rectifier mode during the second data communications mode.

The control circuitry may determine whether to configure the wireless power receiving device in the first data communications mode or the second data communications mode during handshaking operations. During handshaking, the control circuitry may initially configure the wireless power receiving device in the first data communications mode. Responsive to performing a successful handshake, the control circuitry may then allow the wireless power receiving device to continue operating in the first data communications mode. Response to performing an unsuccessful handshake, however, the control circuitry may reconfigure the wireless power receiving device in the second data communications mode and reattempt the handshake.

In accordance with another suitable arrangement, the wireless power receiving device may include an adjustable capacitive bank (e.g., a capacitive array) coupled to the coil and control circuitry operable to configure the wireless power receiving device in a first data communications mode by activating at least a first portion of capacitors in the adjustable capacitive bank and to configure the wireless power receiving device in a second data communications mode by activating at least a second portion of capacitors in the adjustable capacitive bank. The control circuitry may dynamically adjust the adjustable capacitive bank to ensure that adequate signal strength is maintained between the wireless power receiving device and the wireless power transmitting device. The control circuitry may be configured to adjust the capacitive bank at least partially based on a rectified voltage output from the rectifier circuitry, on the size of the load driven by the rectifier circuitry, on the type of the wireless power transmitting device, and/or on the communications protocol specified by the power transmitting device.

DETAILED DESCRIPTION

A wireless power system has a wireless power transmitting device that transmits power wirelessly to a wireless power receiving device. The wireless power transmitting device has one or more coils that are used in transmitting wireless power to one or more wireless power receiving coils in the wireless power receiving device. During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
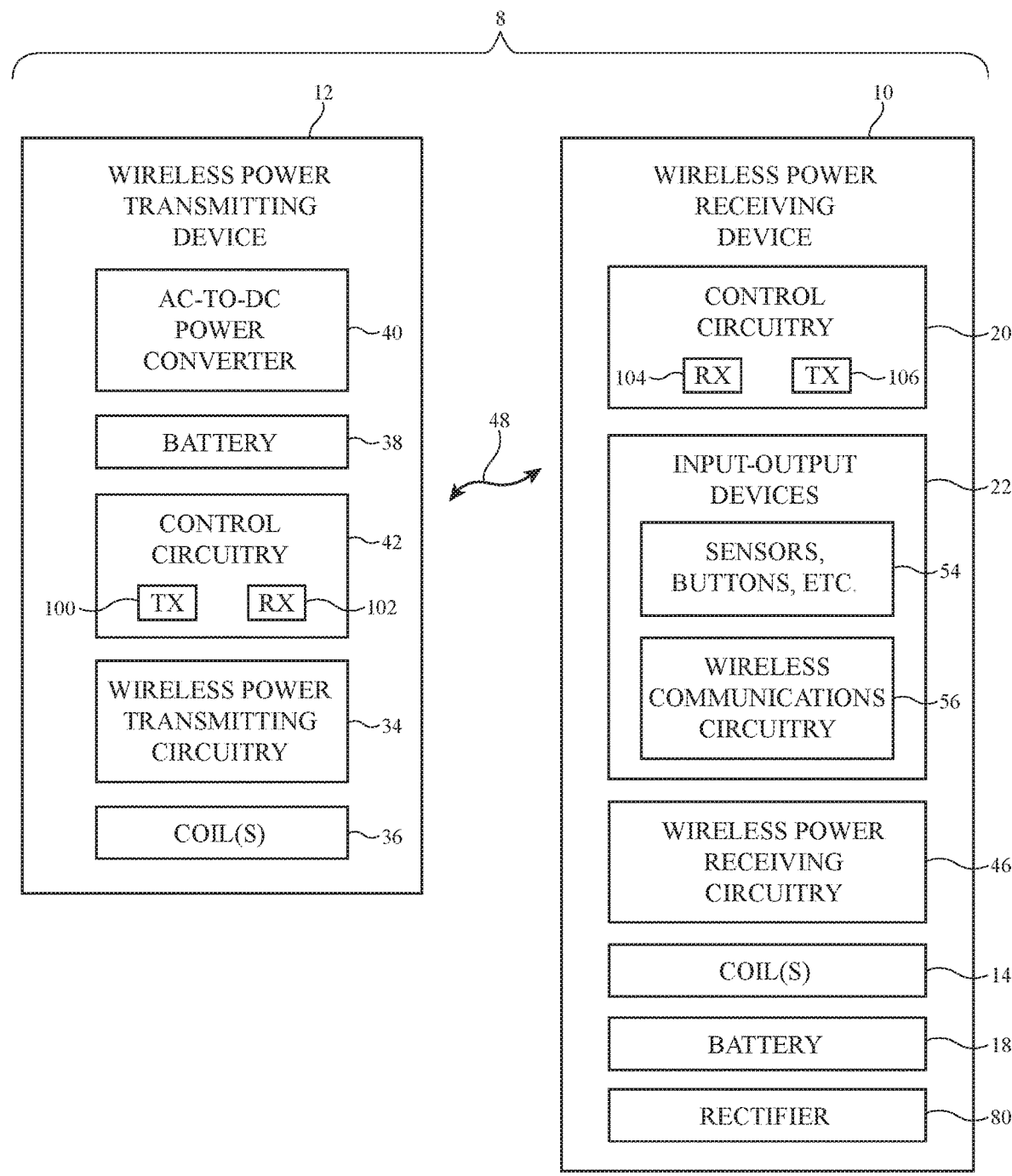
FIG. 1 is a schematic diagram of an illustrative wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 10 is a portable electronic device such as a wristwatch, a cellular telephone, a media player, a pair of earbuds, a remote control, a tablet computer, a laptop computer, an electronic stylus, pen, or pencil, or other electronic equipment. Device 12 may be a stand-alone device such as a wireless charging mat, wireless charging puck, wireless charging stand, wireless charging table, a desktop computer, a laptop computer, a tablet, or other suitable wireless charging equipment.

Devices 12 and 10 include control circuitry 42 and 20, respectively. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions.

Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid-state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

During operation of system 8, a user places one or more devices 10 on the charging surface of device 12. Device 10 may also be otherwise attached or mounted to device 12 during wireless charging operations. Power transmitting device 12 is optionally coupled to a source of alternating-current voltage such as an alternating-current power source (e.g., a wall outlet that supplies line power or other source of mains electricity), has a battery such as battery 38 for supplying power, and/or is coupled to another source of power. A power converter such as AC-DC power converter 40 can convert power from a main power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10. Coils 36 are therefore sometimes referred to as wireless power transmitting coils or wireless power transfer coils. In general, device 12 may have any suitable number of coils 36 (e.g., 1-100 coils, 5-25 coils, more than 100 coils, more than 5 coils, more than 10 coils, fewer than 40 coils, fewer than 30 coils, etc.), and device 10 may have any suitable number of coils 14.

Wireless power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the inverter circuit, alternating-current electromagnetic fields (wireless power signals 48) are produced that are received by one or more corresponding coils 14 coupled to wireless power receiving circuitry 46 in receiving device 10. When the alternating-current electromagnetic fields are received by coil 14, corresponding alternating-current currents and voltages are induced in coil 14.

Rectifier circuit 80, which is sometimes considered to be part of circuitry 46, converts the received AC signals (e.g., received alternating-current currents and voltages associated with wireless power signals 48) from one or more coils 14 into DC voltage signals for powering device 10. The DC voltages are used in powering components in device 10 such as sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Device 12 and/or device 10 may communicate wirelessly. Devices 10 and 12 may, for example, have wireless transceiver circuitry in control circuitry 42 and 20 (and/or wireless communications circuitry such as circuitry 56) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

When it is desired to transmit data from device 12 to device 10, data transmitter circuitry 100 in control circuitry 42 may be used in modulating the signals that are supplied to coil 36. Control circuitry 20 of power receiving device 10 may use a data receiver circuit such as data receiver 104 to demodulate the modulated signal pulses from transmitter 100. Conversely, data transmitter circuit 106 of device 10 may be used in producing signals that are transmitted by coil 14 to coil 36 of device 12 and that are demodulated by data receiver 102 in control circuitry 42 of device 12.

When it is desired to transmit data from device 10 to device 12, device 12 may optionally cease transmission of power. While device 12 is not transmitting wireless power to device 10, data transmitter circuit 106 of device 10 may modulate one or more transistors in wireless power receiving circuitry 46 or control circuitry 20, thereby creating wireless signals that are transmitted from coil 14 to coil 36 of device 12. Because data signals are conveyed wirelessly from device 10 to device 12 using coils 14 and 36, this type of data communications between device 10 and device 12 may sometimes be referred to as "in-band" communications. Device 12 may use data receiver 102 to demodulate the wireless signals from device 10 and thereby receive the data transmitted from device 10. The transmitted data may be used to enable communication between device 10 to device 12, for example to supply feedback or other control signals to device 12, or may be used to convey other information. This example in which transmission of power is temporarily suspended during data transmission is merely illustrative. If desired, wireless power transmission and data reception may occur simultaneously (without ceasing the transmission of power).

When device 12 is in power transmission mode, control circuitry 42 may use pulse-width modulation (PWM) to modulate the AC drive signals that are being supplied to output inverter transistors coupled to coil 36 and thereby adjust how much power is being supplied to device 10. For instance, the duty cycle of the PWM pulse train may be adjusted dynamically to adjust the amount of power being wirelessly transmitted from device 12 to device 10. The duty cycle of the PWM pulses may, if desired, be adjusted based on power transmission feedback information that is conveyed in-band from data transmitter 106 to data receiver 102. For example, device 12 can use information that has been transmitted back from device 10 to device 12 to increase or decrease the amount of transmitted power that device 12 is providing to device 10.

The output inverter transistors in wireless power transmitting circuitry 34 are modulated to create an AC output waveform signal suitable for driving coil 36 for wireless power transfer. In some examples this signal has a frequency in the kilo-Hertz range, such as between 100 to 400 kHz, including frequencies particularly in the 125 to 130 kHz range. In some examples this signal is in the mega-Hertz range, such as about 6.78 MHz or more generally between 1 to 100 MHz. In some examples this signal is in the giga-Hertz range, such as about 60 GHz and more generally between 1 to 100 GHz. As this AC signal passes through coil 36, a corresponding wireless power signal (electromagnetic signal 48) is created and conveyed to coil 14 of device 10. This AC frequency at which power transmitting circuitry 34 is modulated is sometimes referred to as the power carrier frequency. Data signals received at receiver 102 may be modulated at a lower frequency. The frequency at which data being transmitted from device 10 to device 12 is modulated is sometimes referred to as the "data rate." For example, when transferring power in the 100 kHz range, the data rate may be 2 kHz, 1-10 kHz, 10-50 kHz, less than 100 kHz, less than 80 kHz, less than 50 kHz, or other suitable frequency above or below 2 kHz.

Figure 2:
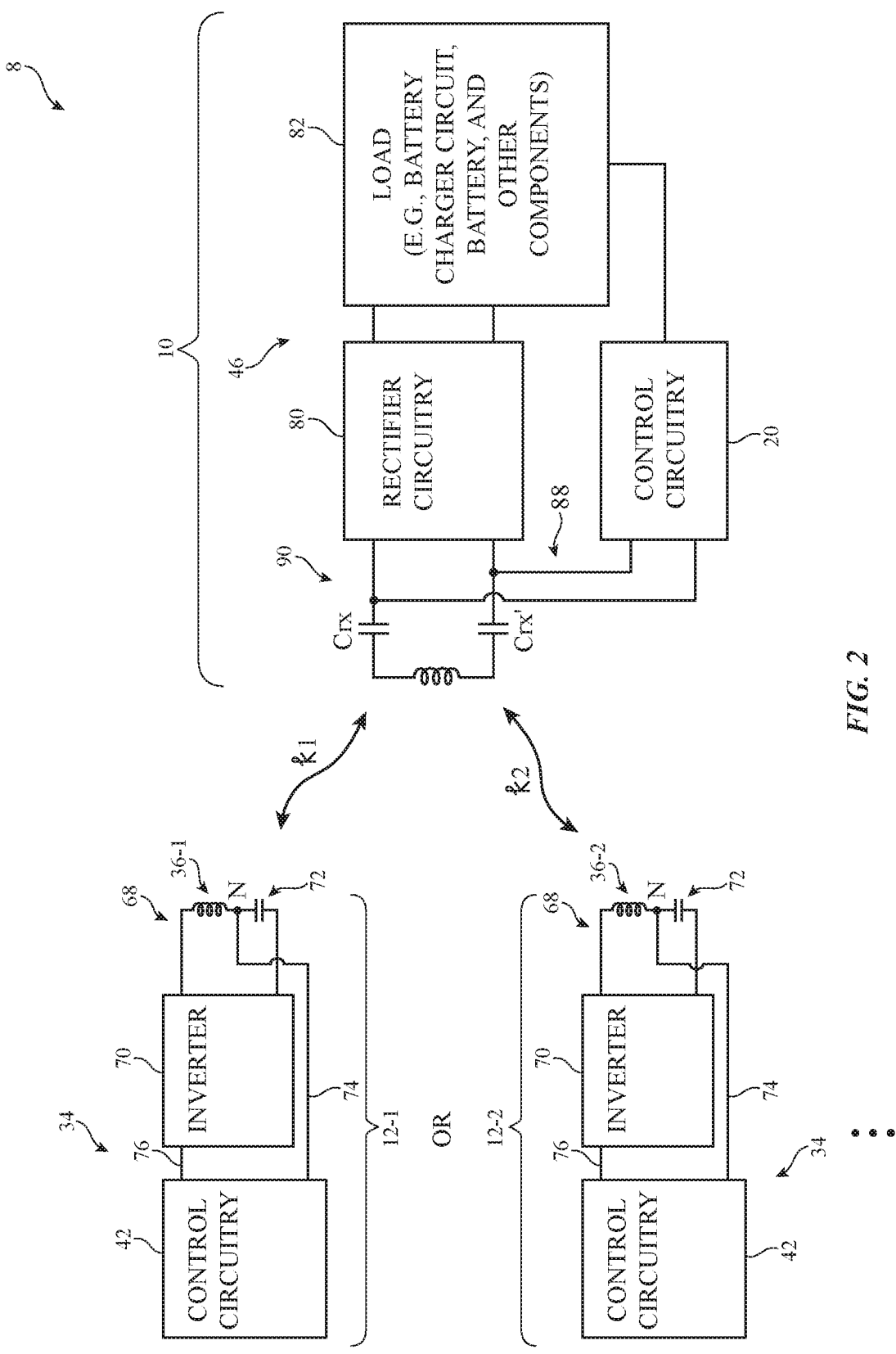
FIG. 2 is a circuit diagram of an illustrative wireless charging system in accordance with an embodiment.

A circuit diagram of illustrative circuitry for wireless power transfer (wireless power charging) system 8 is shown in FIG. 2. As shown in FIG. 2, wireless power receiving device 10 may be charged using either a first power transmitting device 12-1 or a second power transmitting device 12-2. Each of the first and second wireless power transmitting devices 12-1 and 12-2 includes wireless power transmitting circuitry 34 having an inverter such as inverter 70 or other drive circuit that produces alternating-current drive signals such as variable-duty-cycle square waves or other drive signals. These signals are driven through an output circuit such as output circuit 68 that includes coil(s) 36 and capacitor(s) 72 to produce wireless power signals that are transmitted wirelessly to device 10.

Control circuitry 42 in each of devices 12-1 and 12-2 may also contain wireless transceiver circuits (e.g., data transmitter 100 and data receiver 102 of FIG. 1) for supporting wireless data transmission between devices 10 and 12 (i.e., device 12-1 or 12-2). In device 10, wireless transceiver circuits in control circuitry 20 (e.g., data receiver 104 and data transmitter 106 of FIG. 1) can use path 88 and coil 14 to transmit data to either device 12-1 or device 12-2. In each of devices 12-1 and 12-2, paths such as path 74 may be used to supply incoming data signals that have been received from device 10 using coil 36 to demodulating (receiver) circuitry in the data receiver of control circuitry 42. If desired, path 74 may also be used in transmitting wireless data to device 10 using coil(s) 36 that is received by the data receiver of circuitry 20 using coil 14 and path 88.

During wireless power transmission operations, transistors in inverter 70 are controlled using AC control signals generated by control circuitry 42. Control circuitry 42 uses control path 76 to supply control signals to the gates of the transistors in inverter 70. The duty cycle and/or other attributes of these control signals and therefore the corresponding characteristics of the drive signals applied by inverter 70 to coil 36 and the corresponding wireless power signals produced by coil 36 can be adjusted dynamically.

Using switching circuitry, control circuitry 42 selects which coil or coils to supply with drive signals. Using duty cycle adjustments and/or other adjustments (e.g., drive frequency adjustments, etc.), control circuitry 42 can adjust the strength of the drive signals applied to each coil.

Wireless power receiving device 10 has wireless power receiving circuitry 46. Circuitry 46 includes rectifier circuitry such as rectifier 80 (e.g., a synchronous rectifier controlled by signals from control circuitry 20) that converts received alternating-current signals from coil 14 (e.g., wireless power signals received by coil 14) into direct-current (DC) power signals for powering circuitry in device 10 such as load 82 (sometimes referred to as an output load). Load circuitry such as load 82 may include battery 18, a power circuit such as a battery charging integrated circuit or other power management integrated circuit(s) that receives power from rectifier circuitry 80 and regulates the flow of this power to battery 18, and/or other input-output devices 22 (FIG. 1). As shown in FIG. 2, one or more capacitors Crx and Crx' are used to couple coil 14 in input circuit 90 of device 10 to input terminals of rectifier circuitry 80. Coupling capacitor Crx' is optional. Rectifier circuitry 80 produces corresponding output power at output terminals that are coupled to load 82. If desired, load 82 may include sensor circuitry (e.g., current and voltage sensors) for monitoring the flow of power from rectifier 80 to load 82.

The ability of device 10 to communicate with or to be charged by device 12 may depend on the inductive (or magnetic) coupling between the coils 14 and 36. The amount of magnetic coupling between coils 14 and 36 may depend on the number of coils 36, the number of active coils 36 (e.g., control circuitry 42 might use multiplexing circuitry to switch a portion of coils 36 into use while deactivating another portion of coils 36), the amount of overlapping among coils 36, the orientation of coils 36 relative to coil 14, the winding of coils 14 and 36, or other physical attribute associated with coils 14 and 36.

In the example of FIG. 2, power transmitting device 12-1 has coil(s) 36-1 of a first configuration, whereas power transmitting device 12-2 has coil(s) 36-2 of a second configuration that is different than the first coil configuration. In other words, the physical arrangement and/or the number of coils may be different between devices 12-1 and 12-2. As a result, a first amount of magnetic coupling may exist between device 12-1 and device 10 when device 10 is charged using device 12-1 (as indicated by a first coupling coefficient k1), whereas a second amount of magnetic coupling may exist between device 12-2 and device 10 when device 10 is charged using device 12-2 (as indicated by a second coupling coefficient k2). Coefficients k1 and k2 are sometimes referred to as magnetic coupling coefficients, electromagnetic coupling coefficients, or inductive coupling coefficients.

As described above, a data transmitter circuit such as data transmitter 106 in control circuitry 20 of device 10 may be configured to modulate one or more transistors in wireless power receiving circuitry 46 to transmit "in-band" data signals from coil 14 to coil 36 of device 12 (e.g., device 10 modulates the data to be transmitted by changing the impedance at coil 14). Device 12 may be configured to decode the corresponding data by sensing the perturbation in the waveform based on the impedance changes at coil 14. In general, any suitable modulation scheme may be used to support transmission of data signals from device 10 to device 12. As an example, transmitter 106 may modulate transmitted data using a modulation scheme such as amplitude-shift keying (ASK) modulation.

Conventionally, the data transmitter at device 10 is capable of generating only one step load current change. For instance, the data transmitter includes only a pair of capacitors with equal capacitance for adjusting the impedance at coil 14. Modulating data by switching the pair of capacitors in and out of use might produce a satisfactory response at device 12-1, assuming coupling coefficient k1 is large enough to induce a sufficiently detectable perturbation at coil 36-1. Device 10 configured in this way might also be capable of properly transmitting data signals to device 12-2 if coupling coefficient k2 is substantially similar to coupling coefficient k1 (e.g., if k2 deviates from k1 by less than 1% of k1, by less than 5% of k1, by less than 10% of k1, by less than 20% of k1, etc.). In situations where coupling coefficient k2 is substantially different than coupling coefficient k1 (e.g., if k2 deviates from k1 by more than 20% of k1, by more than 30% of k1, by more than 50% of k1, by more than 100% of k1, etc.), modulating data by switching the same pair of identical capacitors in and out of use would risk not producing a satisfactory response at device 12-2 if coupling coefficient k2 is too small to induce a sufficiently detectable perturbation at coil 36-2.

To enable device 10 to communicate effectively with two or more power transmitting devices exhibiting different coupling coefficients or different levels of magnetic coupling with coil 14, device 10 may be provided with at least two different sets of capacitors, where a first set of capacitors generates a first step load (or impedance) change that is suitable for communicating with device 12-1 during a first charging mode and where a second set of capacitors generates a second step load (or impedance) change that is suitable for communicating with device 12-2 during second charging mode.

Figure 3:
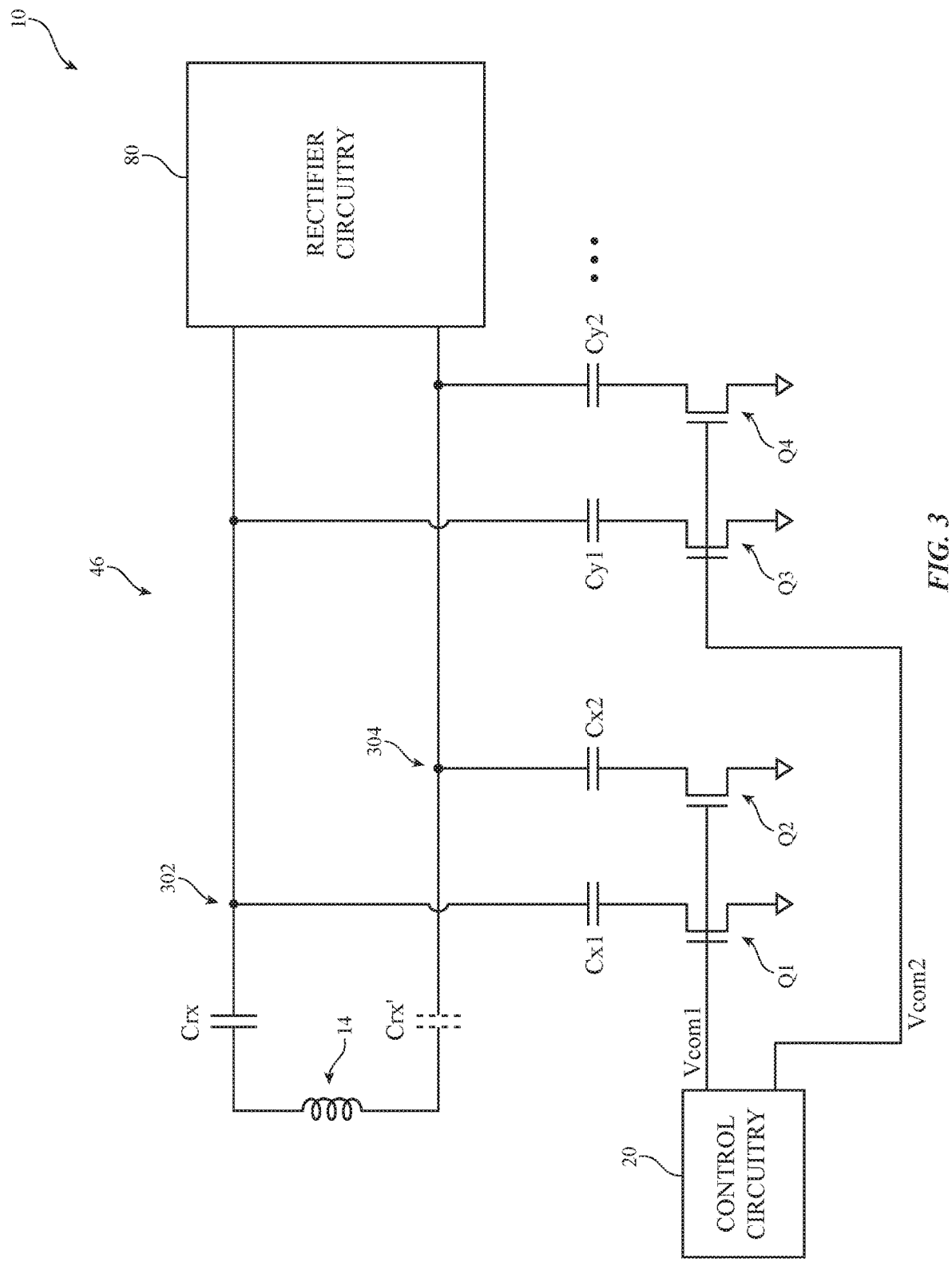
FIG. 3 is a circuit diagram of an illustrative wireless power receiving device having identical capacitors selectively coupled to both terminals of a wireless power receiving coil when transmitting data to a wireless power transmitting device in accordance with an embodiment.

FIG. 3 is a circuit diagram of an illustrative wireless power receiving device 10 that is provided with at least two sets of capacitors for modulating the impedance at coil 14 for transmitting data signals back to the wireless power transmitting device. As shown in FIG. 3, a first capacitor Cx1 has a first terminal that is coupled to node 302, which connects capacitor Crx to rectifier circuitry 80, and a second terminal that is coupled to switch Q1. A second capacitor Cx2 has a first terminal that is coupled to node 304, which connects capacitor Crx' to rectifier circuitry 80, and a second terminal that is coupled to switch Q2. Capacitor Crx' may be optional. If capacitor Crx' is omitted, node 304 would be directly connected to coil 14. Capacitors Cx1 and Cx2 and switches Q1 and Q2 may be considered as part of data transmitter 106 (FIG. 1), as separate from data transmitter 106 but also part of control circuitry 20, or as part of wireless power receiving circuitry 46.

Switches Q1 and Q2 may be implemented as complementary metal-oxide semiconductor (CMOS) transistors, bipolar junction transistors (BJTs), micro-electro-mechanical systems (MEMS) switches, or other suitable types of electrical switches. Transistors Q1 and Q2 may have source terminals that are connected to a ground power supply line and gate terminals that receive a first control signal Vcom1 from control circuitry 20. Configured in this way, control circuitry 20 may toggle Vcom1 to modulate transistors Q1 and Q2 to simultaneously switch capacitors Cx1 and Cx2 into use to effect a first amount of impedance change at coil 14. Since capacitors Cx1 and Cx2 are switched on and off at the same time across both terminals of coil 14, the capacitance value of Cx1 and Cx2 should be equal (e.g., capacitors Cx1 and Cx2 are equally sized and should be symmetrically coupled to both ends of coil 14).

Modulating data communications signal Vcom1 to switch the first set of capacitors Cx1 and Cx2 into use may be suitable for transmitting data signals to device 12-1 (e.g., capacitors Cx1 and Cx2 are designed to operate effectively with coupling coefficient k1). In general, if the magnetic coupling coefficient is small, a larger switching capacitance is needed at coil 14 to effectuate the desired amount of response at coil 36. On the other hand, if the magnetic coupling coefficient is large, a smaller switching capacitance is needed at coil 14 to produce a detectable response at coil 36.

Still referring to FIG. 3, a third capacitor Cy1 has a first terminal that is coupled to node 302 and a second terminal that is coupled to switch Q3. A fourth capacitor Cy2 has a first terminal that is coupled to node 304 and a second terminal that is coupled to switch Q4. Capacitors Cy1 and Cy2 and switches Q3 and Q4 may be considered as part of data transmitter 106 (FIG. 1), as separate from data transmitter 106 but also part of control circuitry 20, or as part of wireless power receiving circuitry 46. Switches Q3 and Q4 may be implemented as complementary metal-oxide semiconductor (CMOS) transistors, bipolar junction transistors (BJTs), micro-electro-mechanical systems (MEMS) switches, or other suitable types of electrical switches.

Transistors Q3 and Q4 may have source terminals that are connected to ground and gate terminals that receive a second control signal Vcom2 from control circuitry 20. Configured in this way, control circuitry 20 may toggle signal Vcom2 to modulate transistors Q3 and Q4 to simultaneously switch capacitors Cy1 and Cy2 into use to effect a second amount of impedance change at coil 14. Since capacitors Cy1 and Cy2 are switched on and off at the same time across nodes 302 and 304, the capacitance value of Cy1 and Cy2 should be equal (e.g., capacitors Cy1 and Cy2 have identical dimensions and should be symmetrically coupled to both ends of coil 14).

Modulating data communications signal Vcom2 to switch the second set of capacitors Cy1 and Cy2 into use may be suitable for transmitting data signals to device 12-2 (e.g., capacitors Cy1 and Cy2 are designed to operate effectively with coupling coefficient k2). Assuming coefficients k1 and k2 are substantially different, the capacitance of Cx1 and Cx2 should also be different from the capacitance of Cy1 and Cy2. As an example, if coupling coefficient k1 is larger than coefficient k2, then the capacitance of Cx1 and Cx2 should be less than the capacitance of Cy1 and Cy2. As another example, if coupling coefficient k1 is smaller than coefficient k2, then the capacitance of Cx1 and Cx2 should be greater than the capacitance of Cy1 and Cy2.

If desired, the capacitors (e.g., Cx1, Cx2, Cy1, and Cy2) may be replaced with resistors, a combination of resistive and capacitive circuits connected in any series or parallel configuration, or other passive electrical components suitable for effectuating the desired amount of impedance change at wireless power receiving coil 14. Rectifier circuitry 80 may be configured as a full-bridge or half-bridge rectifier, depending on the output voltage requirements at load 82. The example of FIG. 3 in which two different sets of capacitors can be independently modulated depending on the perceived coupling coefficient is merely illustrative. If desired, additional sets or pairs of capacitors may be included to enable device 10 to communicate with any number of wireless power transmitting devices with different coupling coefficients.

In the example of FIG. 3, four switching capacitors Cx1, Cx2, Cy1, and Cy2 are needed for device 10 to communicate under two different modes: (1) a first mode for transmitting data to device 12-1 via a first coupling coefficient k1 and (2) a second mode for transmitting data to device 12-2 via a second substantially different coupling coefficient k2. Using four switching capacitors in this way, however, takes up valuable circuit area and increases the cost of device 10. To save cost, space, and energy, switching capacitors can be coupled to only one end of coil 14 (see, e.g., FIG. 4).

Figure 4:
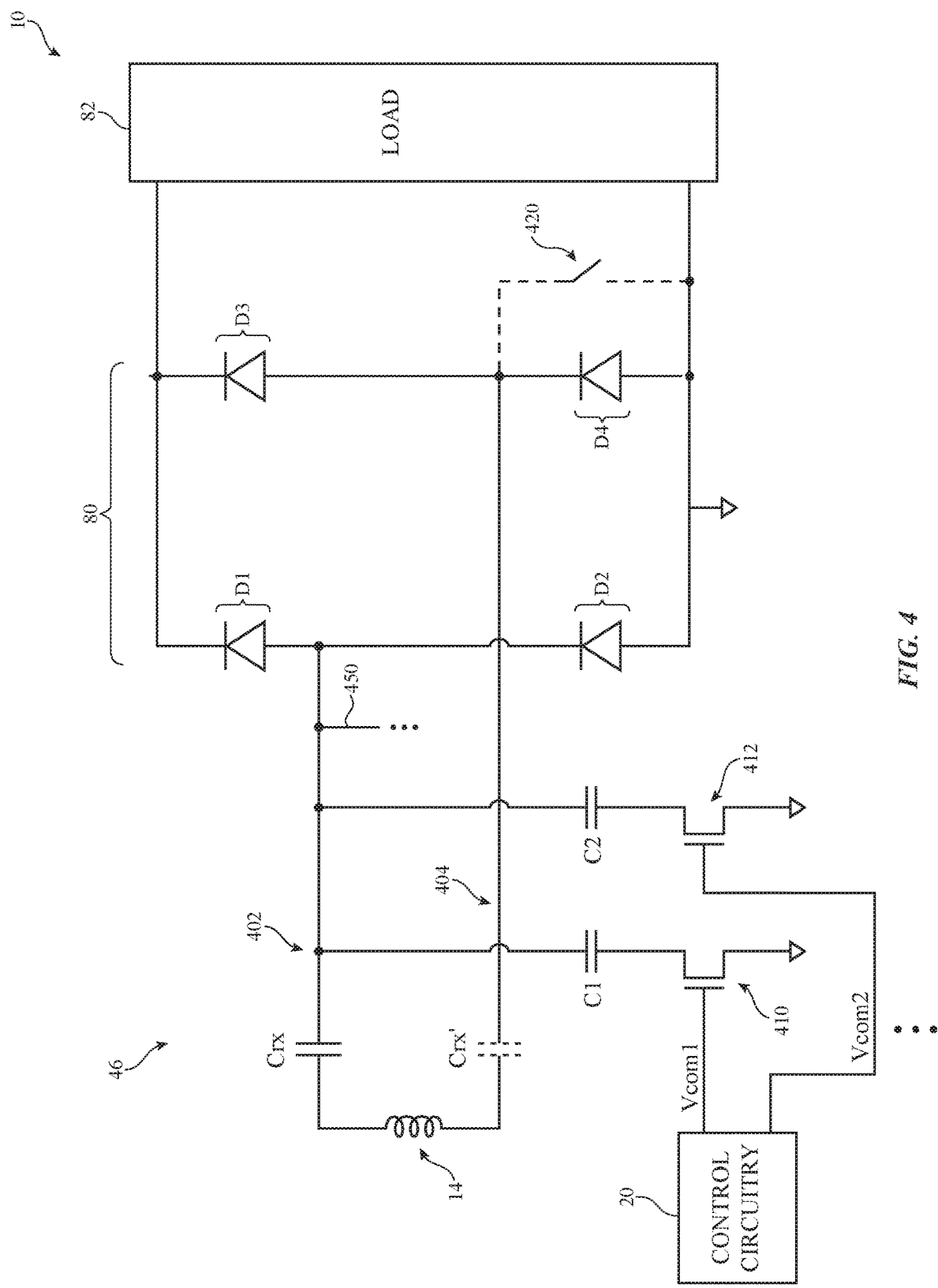
FIG. 4 is a circuit diagram of an illustrative wireless power receiving device having capacitors of varying values that are selectively coupled to only one terminal of a wireless power receiving coil when transmitting data to a wireless power transmitting device in accordance with an embodiment.

As shown in FIG. 4, a first capacitor C1 has a first terminal coupled to node 402, which connects capacitor Crx to rectifier circuitry 80, and a second terminal coupled to switch 410. A second capacitor C2 has a first terminal coupled to node 402 and a second terminal coupled to switch 412. Switches 410 and 412 may be implemented as complementary metal-oxide semiconductor (CMOS) transistors, bipolar junction transistors (BJTs), micro-electro-mechanical systems (MEMS) switches, or other suitable types of electrical switches. Capacitors C1 and C2 and switches 410 and 412 may be considered as part of data transmitter 106 (FIG. 1), as separate from data transmitter 106 but also part of control circuitry 20, or as part of wireless power receiving circuitry 46.

Switch 410 has a gate terminal that receives first communications control signal Vcom1 from control circuitry 20, whereas switch 412 has a gate terminal that receives second communications control signal Vcom2 from control circuitry 20. Control circuitry 20 may either modulate signal Vcom1 when communicating with power transmitting device 12-1 or modulate signal Vcom2 when communicating with power transmitting device 12-2. Modulating data communications signal Vcom1 to switch capacitor C1 into use may be suitable for transmitting data signals to device 12-1 (e.g., capacitor C1 is designed to operate effectively with coupling coefficient k1). Alternatively, modulating data communications signal Vcom2 to switch capacitor C2 into use may be suitable for transmitting data signals to device 12-2 (e.g., capacitor C2 is designed to operate effectively with coupling coefficient k2).

Assuming coefficients k1 and k2 are substantially different, the capacitance of C1 should also be different from the capacitance of C2. As an example, if coupling coefficient k1 is larger than coefficient k2, then the capacitance of C1 should be less than the capacitance of C2. As another example, if coupling coefficient k1 is smaller than coefficient k2, then the capacitance of C1 should be greater than the capacitance of C2. If desired, signals Vcom1 and Vcom2 can be modulated simultaneously (e.g., to switch both capacitors C1 and C2 into use) to effectuate a third step load or impedance change at coil 14 that is suitable for yet another coupling coefficient that is different than k1 or k2.

The example of FIG. 4 where only two switching capacitors C1 and C2 are needed for device 10 to operate in the two different data transmission modes (as opposed to using four capacitors and associated switches in FIG. 3) can therefore help save area and reduce power consumption for device 10. If desired, switching capacitors C1 and C2 may be replaced with resistors, a combination of resistive and capacitive circuits connected in any series or parallel configuration, or other passive electrical components suitable for effectuating the desired amount of impedance change at wireless power receiving coil 14. If desired, one or more additional switching capacitors may be connected to node 402 (as indicated by path 450) to enable device 10 to communicate with any number of wireless power transmitting devices with different coupling coefficients, where each additional switching capacitor has a different or equal capacitance as capacitor C1 or capacitor C2.

Rectifier circuitry 80 may be operable as either a full-bridge or half-bridge rectifier, depending on the output voltage requirements at load 82. As shown in FIG. 4, rectifier circuitry 80 may include a first diode D1 having a first (p-type) terminal connected to node 402 and a second (n-type) terminal connected to load 82, a second diode D2 having a first (p-type) terminal connected to the ground line and a second (n-type) terminal connected to node 402, a third diode D3 having a first (p-type) terminal connected to node 404 (which is connected to coil 14 via optional coupling capacitor Crx') and a second (n-type) terminal connected to load 82, and a fourth diode D4 having first (p-type) terminal connected to the ground line and a second (n-type) terminal connected to node 404. Note that no switching capacitor is coupled to node 404 (i.e., switching capacitors such as C1 and C2 are only coupled to node 402).

The mode is which rectifier circuitry 80 is operated should also depend on the coupling coefficient. When device 10 is being charged by device 12 via a relatively low coupling coefficient k_low, a smaller AC signal will be induced at wireless power receiving circuitry 46, which is more suitable for half-bridge rectification. In such scenarios, switch 420 may be turned on to short out diode D4 (i.e., by connecting node 404 directly to ground). Enabling switch 420 also effectively disables diode D3 since the p-type terminal of diode D3 is fixed at ground. On the other hand, when device 10 is being charged by device 12 via a relatively high coupling coefficient k_high, a larger AC signal will be induced at wireless power receiving circuitry 46, which is more suitable for full-bridge rectification. In such scenarios, switch 420 is turned off, thus enabling all diodes D1-D4 for normal full-bridge rectifying operations.

Figure 5:
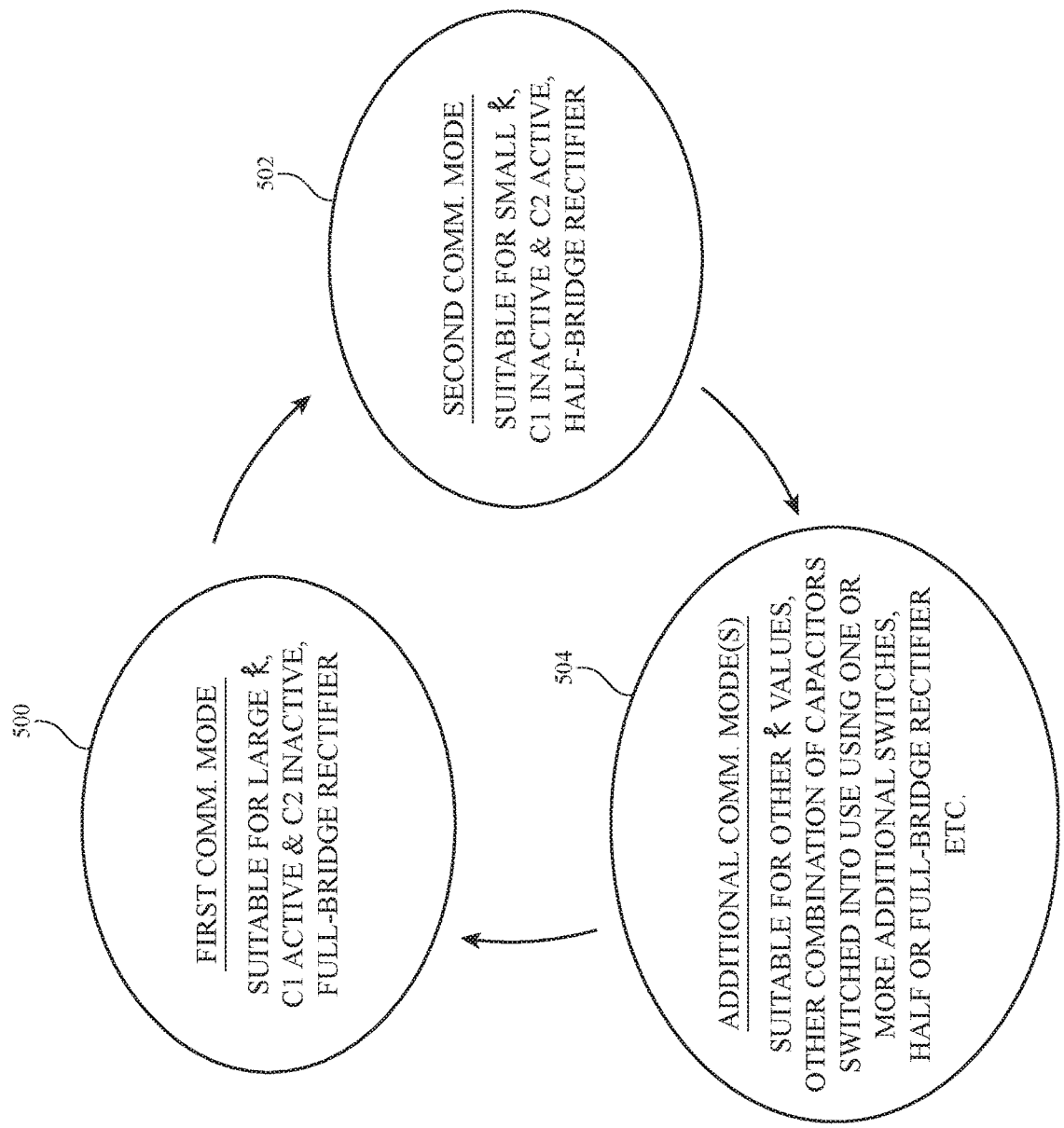
FIG. 5 is a diagram of various wireless in-band communications modes in which a wireless power receiving device of the type shown in FIG. 4 may be operated in accordance with an embodiment.

FIG. 5 is a diagram showing various wireless in-band communications modes in which device 10 of the type shown in FIG. 4 may be operated. As shown in FIG. 5, device 10 may be operated in a first data communications mode 500. Mode 500 may be suitable for transmitting data to a corresponding wireless power transmitting device where the coupling coefficient k is large. During mode 500, capacitor C1 may be enabled by modulating switch 410 while capacitor C2 is idle by keeping switch 412 off (assuming capacitor C1 is smaller than C2). When the coupling coefficient is large, rectifier circuitry 80 may be configured as a full-bridge rectifier (e.g., by deactivating switch 420).

Device 10 may also be operable in a second data communications mode 502. Mode 502 may be suitable for transmitting data to a corresponding wireless power transmitting device where the coupling coefficient k is small. During mode 502, capacitor C2 may be switched into use by modulating switch 412 while capacitor C1 is switched out of us by keeping switch 410 idle (again assuming capacitor C1 is smaller than C2). When the coupling coefficient is small, rectifier circuitry 80 may be configured as a half-bridge rectifier (e.g., by activating switch 420).

Device 10 may optionally be operable in one or more additional data communications mode(s) 504. Mode 504 may be suitable for transmitting data to a corresponding wireless power transmitting device where the coupling coefficient k has some other value different than those covered by modes 500 and 502. During mode 504, some other combination of capacitors (or resistors) may be switched into use using one or more additional switches, and rectifier circuitry 80 may be configured in either the full-bridge or half-bridge mode depending on the voltage requirements at load 82.

Figure 6:
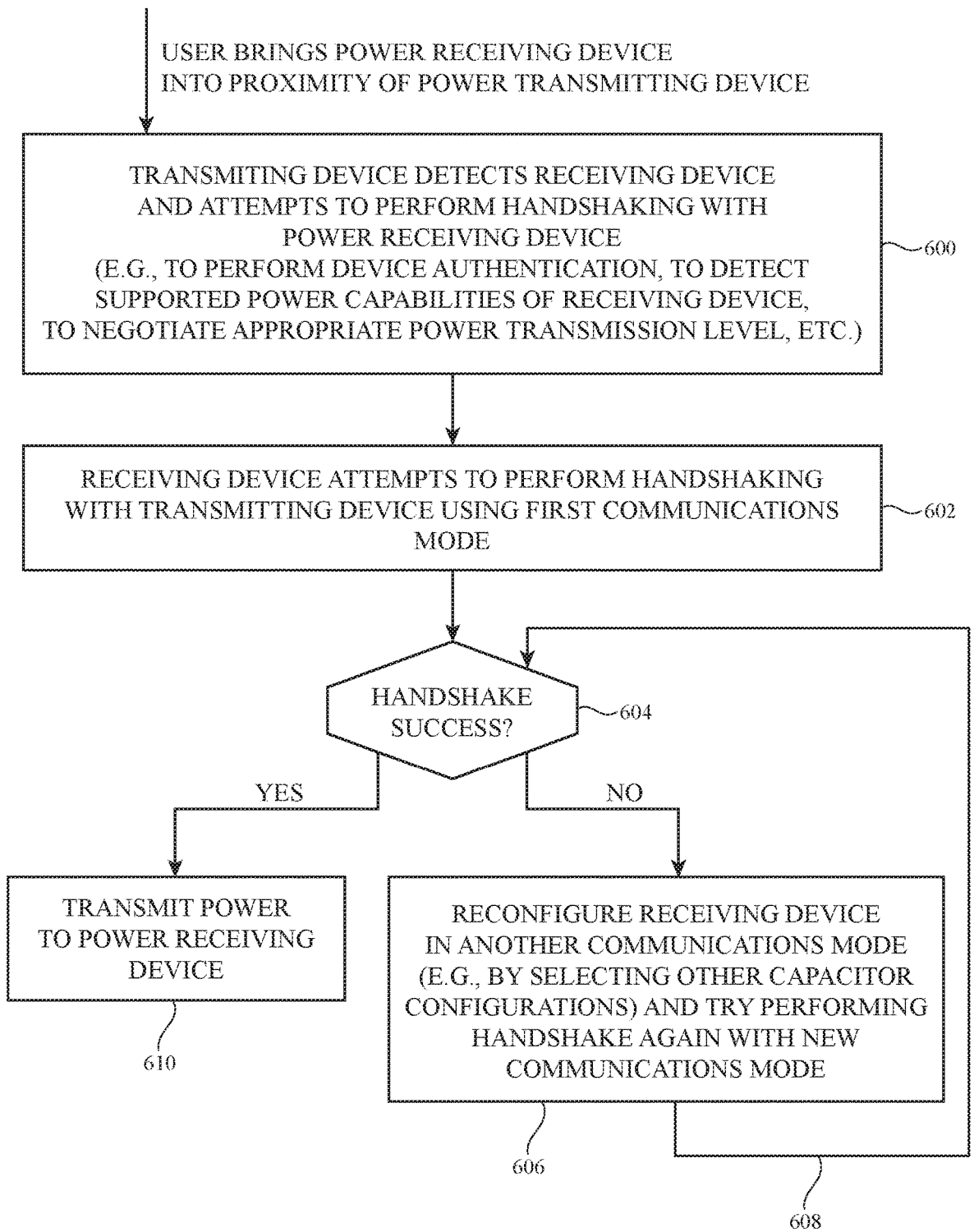
FIG. 6 is a flow chart of illustrative steps for configuring a wireless power receiving device of the type shown in FIG. 4 for proper data transmission in accordance with an embodiment.

FIG. 6 is a flow chart of illustrative steps for configuring wireless power receiving device 10 of the type shown in FIG. 4 for proper data transmission. A user may first bring a power receiving device 10 into proximity of a power transmitting device 12. For example, the user may place device 10 on a charging surface of device 12 or may otherwise attach or mount device 10 onto device 12.

At step 600, power transmitting device 12 may detect the power receiving device 10 and may attempt to perform handshaking with power receiving device 10. Example handshaking operations that may be performed between devices 10 and 12 may include performing device authentication (e.g., to authenticate device 10 to device 12), to detect supported power capabilities of receiving device 10 (e.g., so that power transmitting device 12 can transmit power to device 10 using the right power settings), to negotiate appropriate power transmission levels, and other handshaking protocols that might be needed to establish a link for proper wireless power transfer from device 12 to device 10 and proper wireless data transfer between devices 10 and 12.

At step 602, power receiving device 10 may attempt to perform handshaking with power transmitting device 12 using a first (default) communications mode (e.g., mode 500 of FIG. 5). At step 604, power receiving device 10 may determine whether a successful handshake has occurred. For example, a successful handshake operation might occur when power receiving device 10 receives a handshake acknowledgement packet from device 12. If handshaking is successful, then no further mode change is needed at power receiving device 10 (e.g., power receiving device 10 may continue to operate and transmit in-band data signals to device 12 using default communications mode 500), and power transmitting device 12 may being transmitting power to power receiving device 10 (step 610).

If handshaking is unsuccessful, power receiving device 10 may be reconfigured in another data communications mode (e.g., mode 502 or 504 of FIG. 5). At step 606, device 10 may reattempt to perform handshaking with power transmitting device 12 using the new communications mode. Processing may loop back to step 604, as indicated by path 608. If the handshaking is now successful between devices 10 and 12, then the new data communications mode now modulates a capacitor with a value that is more suitable the current coupling coefficient that exists between devices 10 and 12.

The steps of FIG. 6 for detecting the coupling coefficient and for selecting the desired communications mode suitable for the detected/perceived coupling coefficient between devices 10 and 12 is merely illustrative and are not intended to limit the scope of the present embodiments. If desired, device 12 may directly or actively transmit this information to device 10 or may otherwise direct device 10 to select the correct switching capacitor, device 10 may have sensing or monitoring circuitry to measure the coupling coefficient or mutual inductance between the coils of devices 10 and 12, or other suitable ways for determining the optimal data transmission mode may be implemented.

Figure 7:
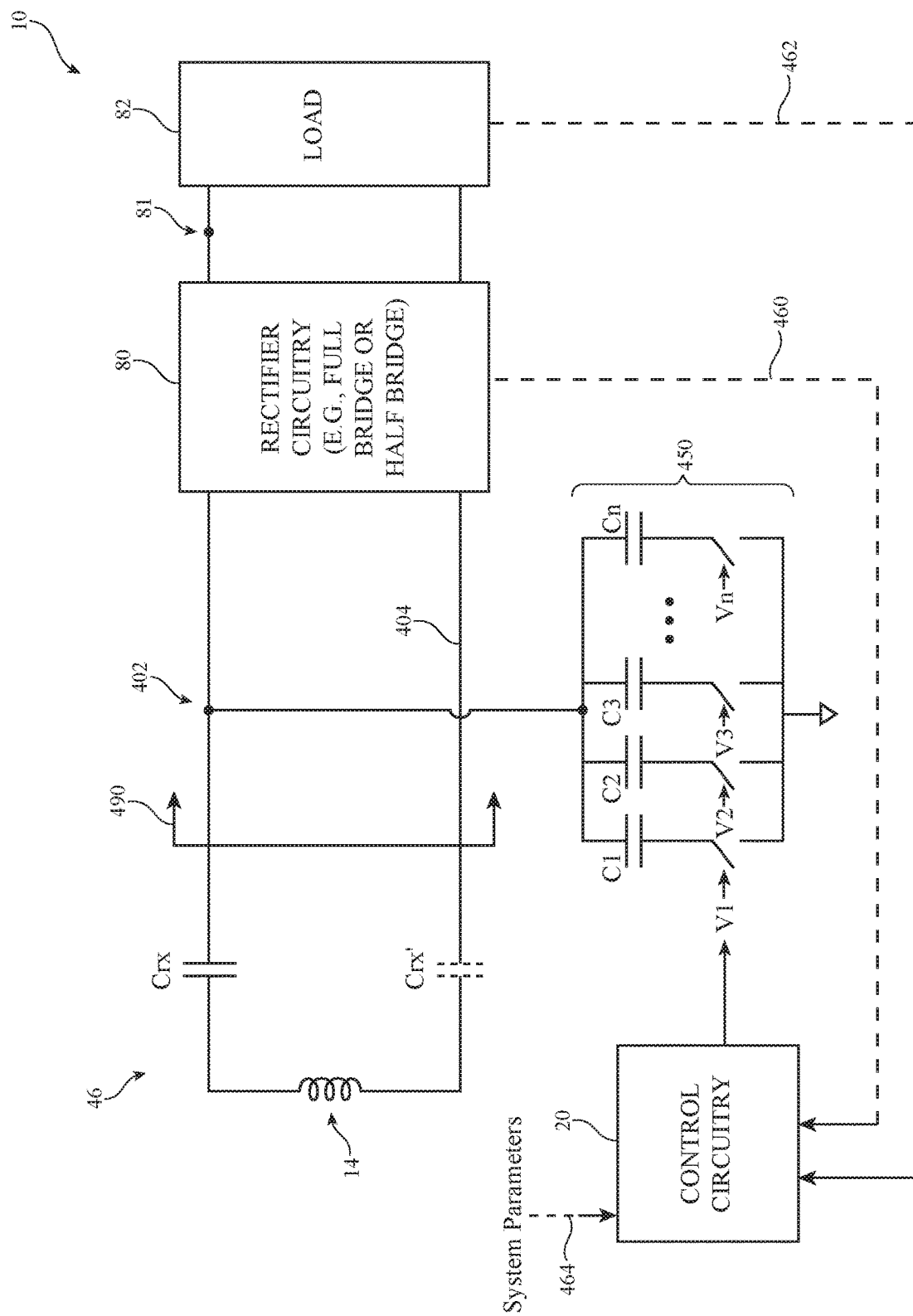
FIG. 7 is a circuit diagram of an illustrative wireless power receiving device having a capacitive bank configurable to support different types of wireless power transmitting devices in accordance with an embodiment.

The example of FIG. 4 in which wireless power receiving circuitry 46 includes at least capacitors C1 and C2 for supporting modes 500, 502, and 504 of FIG. 5 is merely illustrative and is not intended to limit the scope of the present embodiments. In accordance with another suitable embodiment, FIG. 7 illustrates wireless power receiving circuitry 46 that is provided with a bank of individually selectable capacitors such as capacitive bank 450. Components within wireless power receiving circuitry 46 marked with the same reference numerals as those already shown in FIG. 4 have the same structure and function and need not be described again in detail in order to avoid obscuring the present embodiments.

As shown in FIG. 7, capacitor bank 450 is coupled to node 42 sitting between capacitor Crx and rectifier circuitry 80. Bank 450 may include an array of capacitors C1, C2, C3, . . . , Cn, each of which can be individually switched into use. In general, "n" may represent any integer greater than or equal to two. A small number of capacitors in bank 450 provides coarse adjustment capability, whereas a large number of capacitors in bank 450 provides finer adjustment capability. Capacitor C1 can be selectively activated by turning on a first switch using first control signal V1; capacitor C2 can be selectively activated by turning on a second switch using second control signal V2; capacitor C3 can be selectively activated by turning on a third switch using third control signal V3; . . . ; and capacitor Cn can be selectively activated by turning on an $n^{th}$ switch using control signal Vn. Control signals V1-Vn may be generated using control circuitry 20. Control circuitry 20 can asserted one or more of control signals V1-Vn (e.g., any subset or even all of the n capacitors may be enabled). Bank 450 configured in this way is therefore sometimes referred to as a capacitor array.

In one suitable arrangement, the n capacitors in capacitive bank 450 may be scaled linearly. As an example, consider a scenario in which capacitive bank includes three capacitors: a first capacitor C1 that exhibits a low capacitance suitable for a first mode of operation, a second capacitor C2 that exhibits an intermediate capacitance suitable for a second mode of operation, and a third capacitor C3 that exhibits a high capacitance suitable for a third mode of operation. In this example, a selected one of the three capacitors C1, C2, or C3 may be enabled depending on the desired mode of operation. This example in which the capacitors in bank 450 are sized using a linear scale is merely illustrative. If desired, the n capacitors in bank 450 may be sized according to a binary scale, exponential scale, or may have suitable other weighting schemes optimized for certain modes of operation.

In general, controller 20 may selectively activate any number of capacitors in bank 450 to adjust the signal strength for data signals transmitted from inductor 14 to a corresponding wireless power transmitting device. The determination of which capacitors in bank 450 to activate may depend on the rectified voltage output from rectifier circuitry 80 (e.g., a full-bridge rectifier circuit or a half-bridge rectifier circuit), may depend on the output load 82, and/or may depend on one or more system parameters received at control circuitry 20 at input 464.

Control circuitry 20 may receive information about the rectified voltage generated by rectifier circuitry 80, which is schematically represented by feedback path 460. If the rectified voltage is low, control circuitry 20 may direct bank 450 to increase its overall capacitance. If the rectified voltage is high (i.e., if there is too much voltage rippling), control circuitry 20 may direct bank to decrease its overall capacitance.

Control circuitry 20 may also receive information about load 82, which is schematically represented by feedback path 462. If the load is small, control circuitry 20 may direct bank 450 to augment its overall capacitance to help increase the signal-to-noise ratio. If the load is large, control circuitry 20 may direct bank 450 to reduce its overall capacitance to help reduce the risk of excessive voltage rippling at the output.

Control circuitry 20 may also receive one or more system parameters associated with device 12 and/or device 10. As an example, the received system parameter may indicate the transmitter type (i.e., the type of wireless power transmitting device 12 that is currently communicating with wireless power receiving circuitry 46). As another example, the received system parameter may indicate the type of communications protocol that is currently being used to support messaging between circuitry 46 and the corresponding transmitter device 12 (regardless of the coupling coefficient that is currently present between devices 10 and 12). For instance, a first communications protocol may operate at a first frequency and have a first bit error rate (BER) criteria, whereas a second communications protocol may operate at a second frequency and have a second BER criteria.

Regardless of the type of information that is received at control circuitry 20, controller 20 may dynamically adjust bank 450 to ensure that adequate signal strength is maintained between device 10 and device 12 throughout the communications process.

Figure 8A:
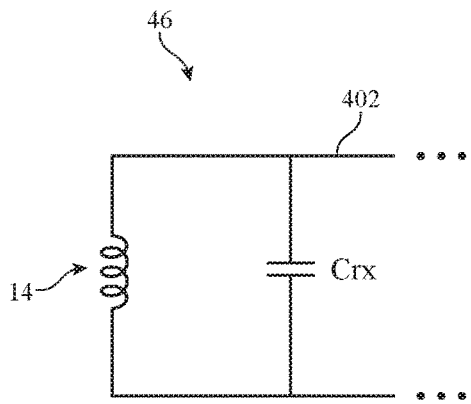
FIGS. 8A-8D are diagrams of different illustrative receiver tuning topologies that can be implemented at the wireless power receiving device in accordance with some embodiments.
Figure 8B:
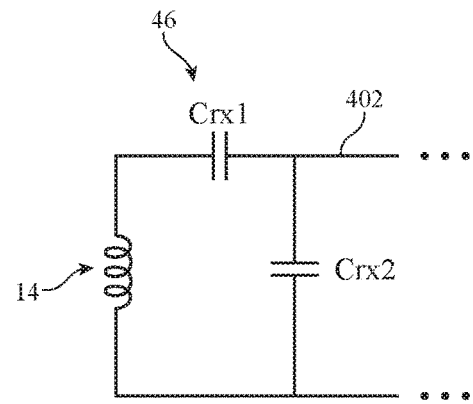
Figure 8C:
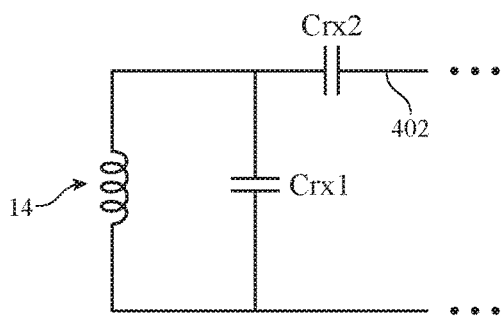
Figure 8D:
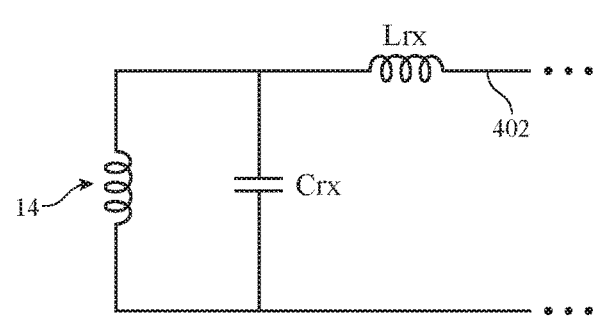

The examples of FIGS. 4 and 7 in which wireless power receiver circuitry 46 has a series LC tuning topology (i.e., inductor 14 and capacitor Crx connected in series as the resonant circuit) are merely illustrative. In general, the wireless power receiver circuitry 46 of FIGS. 4 and 7 may be extended to support any receiver tuning architecture (see, e.g., FIGS. 8A-8D). FIG. 8A shows an illustrative parallel LC tuning topology, where inductor 14 and capacitor Crx are coupled in parallel. FIG. 8B shows a first illustrative LCC tuning topology, where inductor 14 and capacitor Crx1 are connected in series and where another capacitor Crx2 is coupled in parallel with the series combination of inductor 14 and Crx1. FIG. 8C shows a second illustrative LCC tuning topology, where inductor 14 and capacitor Crx1 are connected in parallel and where another capacitor Crx2 is coupled in series with the parallel combination of inductor 14 and Crx1. FIG. 8D shows an illustrative LCL tuning topology, where inductor 14 and capacitor Crx are connected in parallel and where another inductor Lrx is coupled in series with the parallel combination of inductor 14 and Crx. If desired, other receiver tuning/resonant circuit topologies can also be implemented.

The example of FIG. 7 where any number of capacitors within bank 450 can be activated provides improved flexibility to support communications with a wide variety of transmitter and protocol types while maintaining an adequate signal level during data communications.

Figure 9:
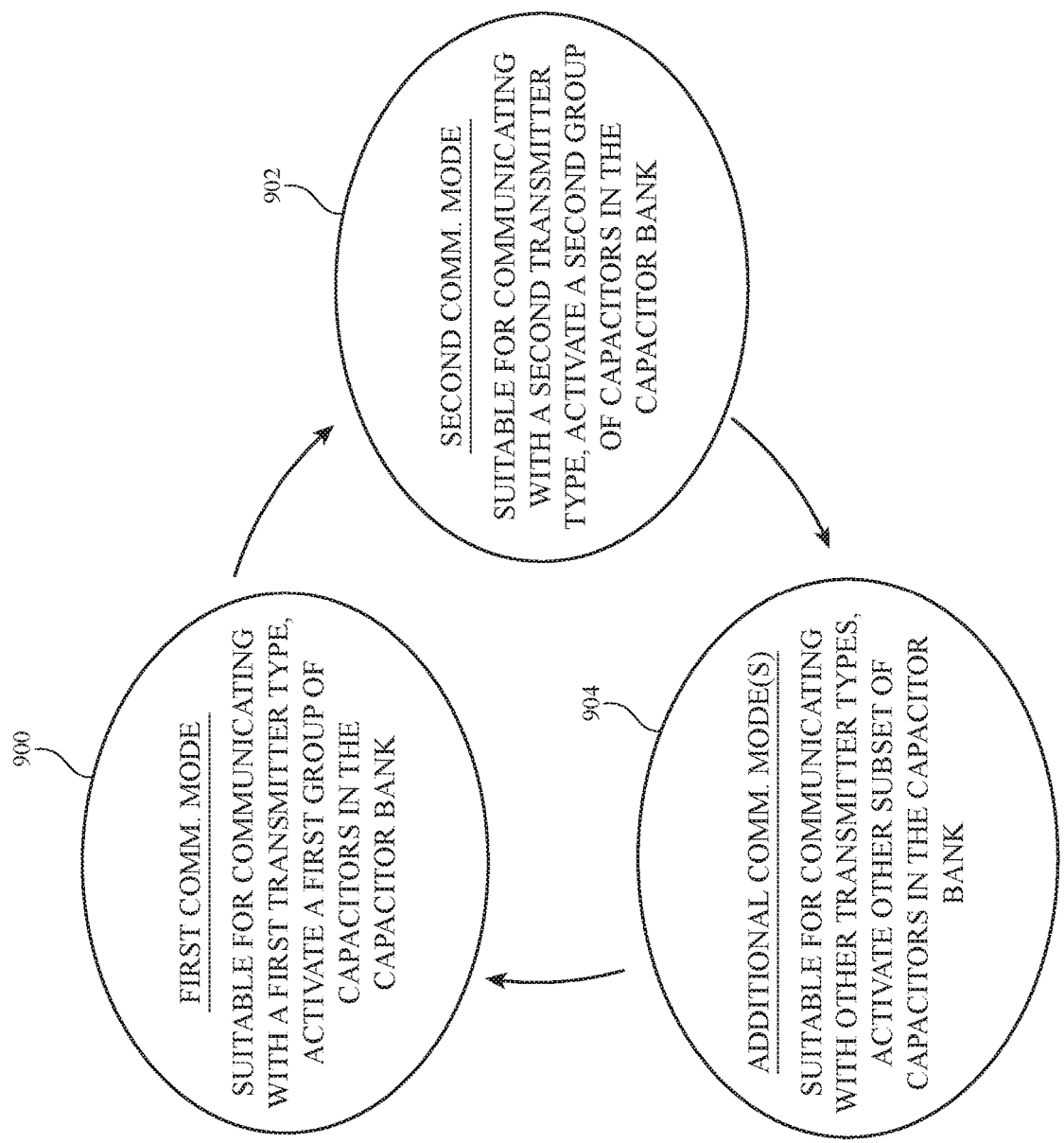
FIG. 9 is a diagram of various wireless in-band communications modes in which a wireless power receiving device of the type shown in FIG. 7 may be operated in accordance with an embodiment.

FIG. 9 is a diagram showing various wireless in-band communications modes in which device 10 of the type shown in FIG. 7 may be operated. As shown in FIG. 9, device 10 may be operated in a first data communications mode 900. Mode 900 may be suitable for communicating with a first transmitter type or for supporting a first communications protocol. During mode 900, a first group of capacitors in bank 450 may be activated (e.g., a first subset or portion of capacitors in the array can be turned on) to ensure that the signal strength is maintained at an acceptable level when wireless power receiving circuitry 46 is communicating with the first transmitter type or when supporting the first communications protocol.

Device 10 may also be operable in a second data communications mode 902. Mode 902 may be suitable for communicating with a second transmitter type that is different than the first transmitter type or for supporting a second communications protocol that is different than the first communications protocol. During mode 902, a second group of capacitors in bank 450 may be activated (e.g., a second subset or portion of capacitors that is different than the first subset in the array can be turned on) to ensure that the signal strength is maintained at an acceptable level when wireless power receiving circuitry 46 is communicating with the second transmitter type or when supporting the second communications protocol.

Device 10 may optionally be operable in one or more additional data communications mode(s) 904. Mode 904 may be suitable for communicating with yet other transmitter types that are different than the first/second transmitter type or for supporting additional communications protocols that are different than the first/second communications protocol. During mode 904, another group of capacitors in bank 450 may be activated (e.g., a third subset or portion of capacitors that is different than the first/second subset in the array can be turned on) to ensure that the signal strength is maintained at an acceptable level when wireless power receiving circuitry 46 is communicating with the other transmitter types or when supporting the additional communications protocols.

Figure 10:
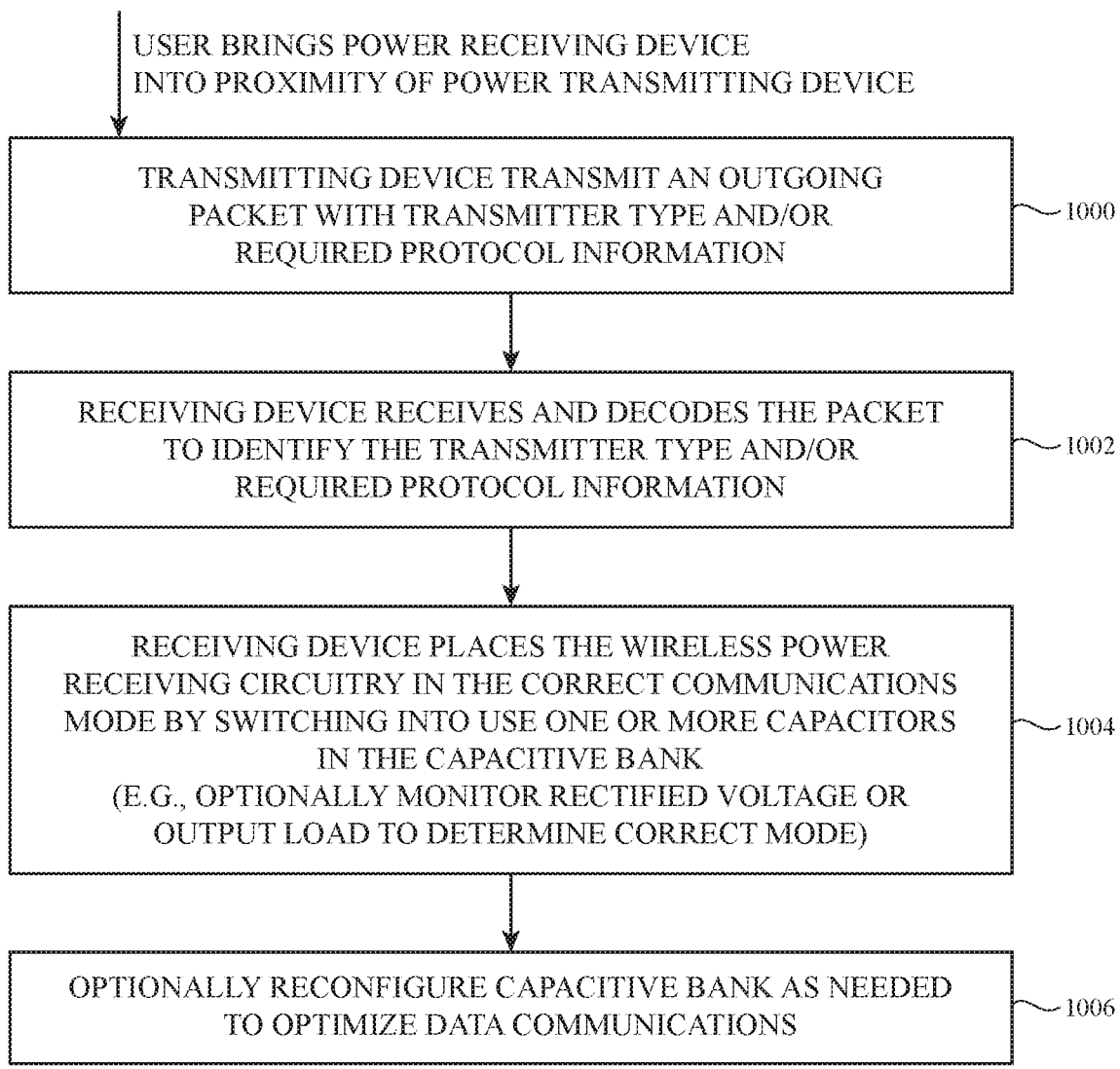
FIG. 10 is a flow chart of illustrative steps for configuring a wireless power receiving device of the type shown in FIG. 7 for proper data transmission in accordance with an embodiment.

FIG. 10 is a flow chart of illustrative steps for operating wireless power receiving device 42 of the type shown in FIG. 7. A user may first bring a power receiving device 10 into proximity of a power transmitting device 12. For example, the user may place device 10 on a charging surface of device 12 or may otherwise attach or mount device 10 onto device 12.

At step 1000, power transmitting device 12 may detect the power receiving device 10 and may attempt to perform handshaking with power receiving device 10. During handshaking operations, transmitting device 12 may transmit an outgoing packet that includes transmitter type information (e.g., control data indicative of the type of device 12) and/or required communications protocol information (e.g., control data reflective of the required data rate, BER, or other signaling criteria). Other exemplary handshaking operations that may be performed at this time may include device authentication, negotiation of appropriate power transmission levels, etc.

At step 1002, power receiving device 10 may receive the packet transmitted from device 12 and may decode the received packet to identify the transmitter type and/or the required protocol. In response to determining the transmitter type and/or the requisite protocol, receiving device 10 may place wireless receiving circuitry 46 in a selected one of the available communications mode (see, e.g., the various modes of FIG. 9) by switching into use one or more capacitors in the capacitive array 450 (at step 1004). The selection of which capacitors in the array to enable may also be based on rectified voltage level at the output of rectifier circuitry 80 and/or the size of output load 82 (see FIG. 7).

Once the selected capacitors have been activated, device 10 may communicate properly with device 12 while maintaining sufficient signal strength. While devices 10 and 12 exchange data, operating conditions could potentially change. If so, controller 20 may optionally reconfigure the capacitive bank 450 as necessary to optimize data communications between devices 10 and 12 (step 1006).

Figure 11:
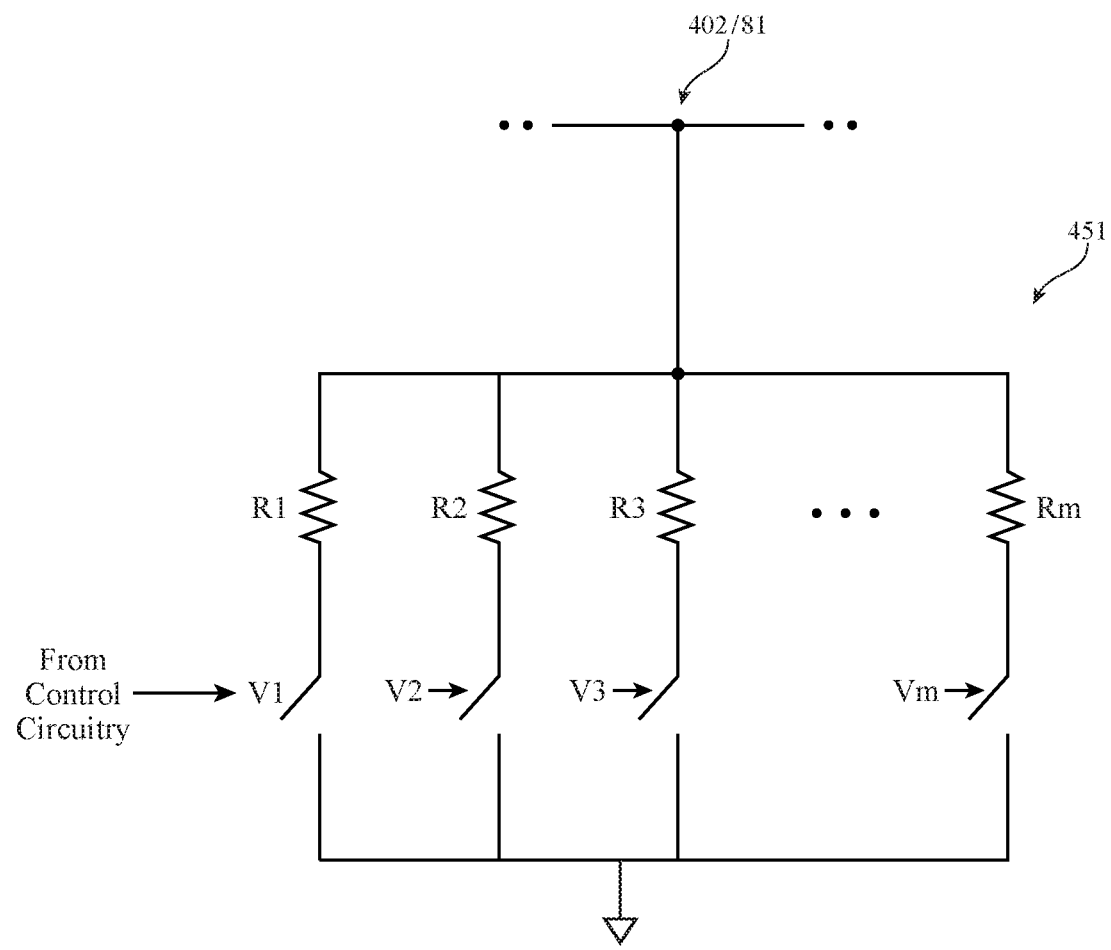
FIG. 11 is a diagram of an illustrative resistive bank that can be used in the wireless power receiving device of the type shown in FIG. 7 in accordance with an embodiment.

The embodiments described in connection with FIGS. 7, 9, and 10 having an adjustable capacitive bank 450 for providing reactance (or imaginary impedance) modulation is merely illustrative and are not intended to limit the scope of the present embodiments. In accordance with another suitable embodiment, wireless power receiving circuitry 46 may instead be modulated using an adjustable resistive bank such resistive bank 451 of FIG. 11. A resistive bank 451 may be configured to provide resistive (or real impedance) modulation at circuitry 46. As shown in FIG. 11, resistive bank 451 may include an array of resistors R1, R2, R3, . . . , Rm, each of which can be individually switched into use. In general, "m" may represent any integer greater than or equal to two. A small number of resistors within bank 451 provides coarse adjustment capability, whereas a large number of resistors within bank 451 provides finer adjustment capability.

Resistor R1 can be selectively activated by turning on a first switch using first control signal V1; resistor R2 can be selectively activated by turning on a second switch using second control signal V2; resistor R3 can be selectively activated by turning on a third switch using third control signal V3; . . . ; and resistor Rm can be selectively activated by turning on an $n^{th}$ switch using control signal Vn. Control signals V1-Vn may be generated using control circuitry 20 (see FIG. 7). Control circuitry 20 can asserted one or more of control signals V1-Vn (e.g., any subset or even all of the m resistors may be enabled). Bank 450 configured in this way is therefore sometimes referred to as a resistive array. Similar to the capacitive example, the m resistors in bank 451 may be sized according to a linear scale, binary scale, exponential scale, or may have suitable other weighting schemes optimized for certain modes of operation.

In general, controller 20 may selectively activate any number of resistors in bank 451 to adjust the signal strength for data signals transmitted from inductor 14 to a corresponding wireless power transmitting device. The determination of which resistors in bank 451 to activate may depend on the rectified voltage output from rectifier circuitry 80 (e.g., a full-bridge rectifier circuit or a half-bridge rectifier circuit), may depend on the size of output load 82, and/or may depend on one or more system parameters described above.

If desired, resistive bank 451 may also be coupled to the rectified DC voltage rail after rectifier circuitry 80 (e.g., at node 81 in FIG. 7). Coupling resistive bank 451 to node 81 can help reduce power loss for the receiver tuning components. Connecting bank 451 to node 81 effectively mimics an adjustable load at node 402 (i.e., bank 451 connected at node 81 can still provide load impedance modulation from the perspective of the receiver's resonant network, when viewed in the direction of arrows 490 in FIG. 7).

Figure 12:
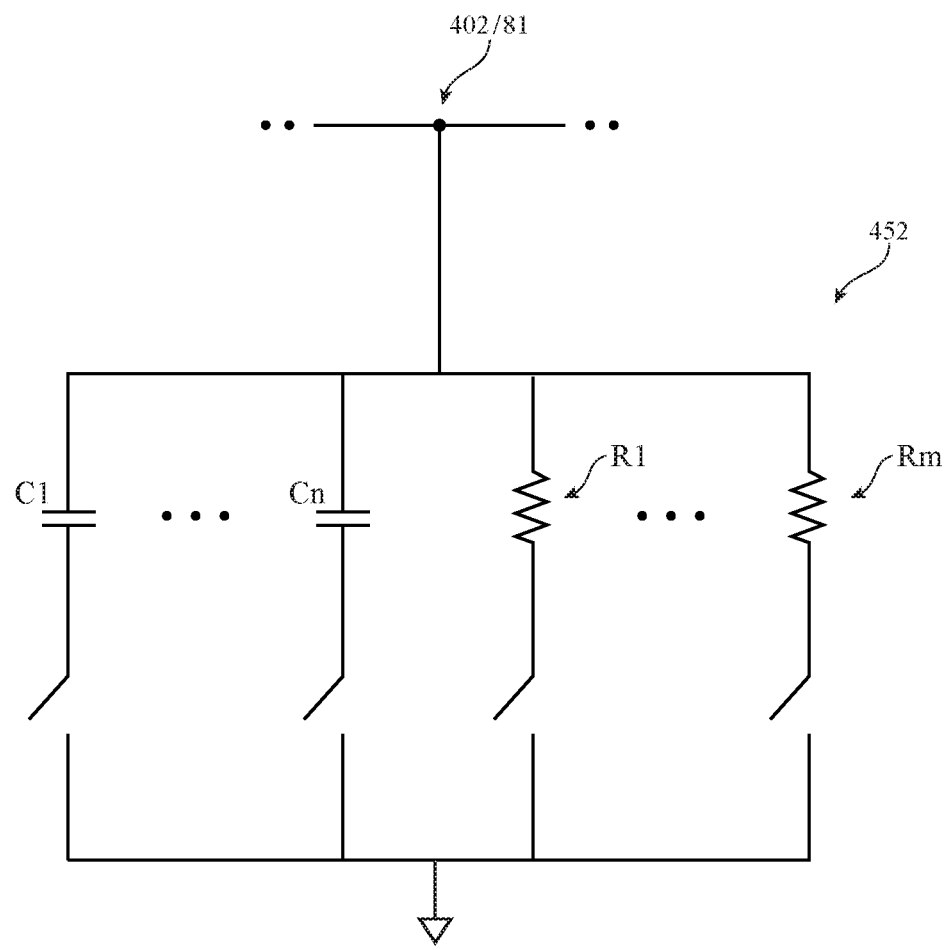
FIG. 12 is a diagram of an illustrative load bank having both capacitors and resistors in accordance with an embodiment.

The example of FIG. 11 in which a purely resistive bank 451 is coupled to node 402 is also merely illustrative. In general, any type of adjustable load bank that include real and/or imaginary impedance components may be coupled to node 402 (see, e.g., FIG. 12). FIG. 12 shows a generic adjustable load bank 452 that may be provided as part of power receiving circuitry 46. As shown in FIG. 12, load bank 451 may include both capacitors C1-Cn and resistors R1-Rm. Integers "n" and "m" may have the same value or different values. Control circuitry 20 may activate only capacitors (e.g., by switching into use one or more of capacitors C1-Cn), may activate only resistors (e.g., by switching into use one or more of resistors R1-Rm), or may activate both capacitors and resistors (e.g., by switching into use at least some of capacitors C1-Cn and at least some of resistors R1-Rm in parallel). Simultaneous activation of both capacitors and resistors in bank 452 is proper so long as the real impedance modulation provided by the activated resistors does not cancel out the imaginary impedance modulation provided by the activated capacitors. The determination of which capacitors and/or resistors in bank 452 to activate may depend on the rectified voltage output from rectifier circuitry 80 (e.g., a full-bridge rectifier circuit or a half-bridge rectifier circuit), may depend on the size of output load 82, and/or may depend on one or more system parameters described above.

If desired, bank 452 may further include other types of passive electrical components (e.g., any combination and number of capacitive, resistance, and/or inductive elements connected in a parallel and/or series configuration) for modulating the impedance at node 402. In yet other suitable embodiments, bank 452 may include constant current loads or ballast loads. Similar to bank 451, adjustable load bank 452 may also be coupled to the rectified DC voltage rail after rectifier circuitry 80 (e.g., at node 81 in FIG. 7). Coupling resistive bank 452 to node 81 can help reduce power loss for the receiver resonant network. Connecting bank 452 to node 81 effectively mimics an adjustable load at node 402 (i.e., bank 452 connected at node 81 can still provide the desired impedance modulation from the perspective of the receiver's resonant network, when viewed in the direction of arrows 490 in FIG. 7).

The foregoing describes a technology that enables robust data transmission in the context of wireless power transfer. The present disclosure contemplates that it may be desirable for a power transmitter and a power receiver device to communicate information such as states of charge, charging speeds, so forth, to control wireless power transfer between devices.

It is possible, however, to transfer other kinds of data, such as data that are more personal in nature. Entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

To the extent that the present technology is leveraged to transmit personal information data, hardware and/or software elements can be provided for users to selectively block the use of, or access to, personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

It is the intent of the present disclosure to describe a robust system for data transmission in a wireless power system. In implementations of this technology were personal information data is transmitted, that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

The foregoing is illustrative and various modifications can be made to the described embodiments. The foregoing embodiments may be implemented individually or in any combination.

What is claimed is:

1. A wireless power receiving device configured to receive wireless power signals from a first wireless power transmitting device or a second wireless power transmitting device, the wireless power receiving device comprising:
   a coil;
   wireless power receiving circuitry coupled to the coil and configured to receive the wireless power signals from the coil; and
   control circuitry operable to:
      configure the wireless power receiving device in a first data communications mode when a first level of magnetic coupling is present between the coil and a wireless power transmitting coil of the first wireless power transmitting device; and
      configure the wireless power receiving device in a second data communications mode that is different than the first data communications mode when a second level of magnetic coupling is present between the coil and a wireless power transmitting coil of the second wireless power transmitting device.

2. The wireless power receiving device of claim 1, further comprising:
   a first switching capacitor coupled to a first end of the coil, wherein the first switching capacitor is selectively activated during the first data communications mode but not during the second data communications mode, and wherein the first and second wireless power transmitting devices are different types of wireless power transmitting devices.

3. The wireless power receiving device of claim 2, further comprising:
   a second switching capacitor coupled to the first end of the coil, wherein the second switching capacitor is selectively activated during the second data communications mode but not during the first data communications mode.

4. The wireless power receiving device of claim 3, wherein no switching capacitor is coupled to the second end of the coil.

5. The wireless power receiving device of claim 3, wherein the first switching capacitor has a first capacitance value, and wherein the second switching capacitor has a second capacitance value that is different than the first capacitance value.

6. The wireless power receiving device of claim 5, wherein the first level of magnetic coupling s greater than the second level of magnetic coupling, and wherein the first capacitance value is less than the second capacitance value.

7. The wireless power receiving device of claim 3, further comprising:
a first switch that selectively activates the first switching capacitor, wherein the first switch is configured to receive a first data communications control signal from the control circuitry during the first data communications mode; and
a second switch that selectively activates the second switching capacitor, wherein the second switch is configured to receive a second data communications control signal from the control circuitry during the second data communications mode.

8. The wireless power receiving device of claim 7, wherein the control circuitry is configured to simultaneously modulate the first and second data communications control signals during a third data communications mode that is different than the first and second data communications mode.

9. The wireless power receiving device of claim 3, further comprising:
rectifier circuitry coupled to the wireless power receiving circuitry, wherein the rectifier circuitry is operable in at least two different modes.

10. The wireless power receiving device of claim 9, wherein the rectifier circuitry is operable in a full-bridge rectifier mode during the first data communications mode and in a half-bridge rectifier mode during the second data communications mode.

11. A method of operating a wireless power receiving device having a wireless power receiving coil, the method comprising:
during a first charging mode, receiving wireless power signals from a first wireless power transmitting device at the wireless power receiving coil, wherein a first level of coupling exists between the wireless power receiving coil and a wireless power transmitting coil of the first wireless power transmitting device;
during a second charging mode, receiving wireless power signals from a second wireless power transmitting device at the wireless power receiving coil, wherein a second level of coupling exists between the wireless power receiving coil and a wireless power transmitting coil of the second wireless power transmitting device, and wherein the second level of coupling is different than the first level of coupling;
configuring the wireless power receiving device in a first data communications mode during the first charging mode; and
configuring the wireless power receiving device in a second data communications mode during the second charging mode.

12. The method of claim 11, further comprising:
with control circuitry within the wireless power receiving device, determining whether to configure the wireless power receiving device in the first data communications mode or the second data communications mode during handshaking operations.

13. The method of claim 12, further comprising:
during the handshaking operations, initially configuring the wireless power receiving device in the first data communications mode; and
in response to performing a successful handshake, causing the wireless power receiving device to continue operating in the first data communications mode; and
in response to performing an unsuccessful handshake, causing the wireless power receiving device in the second data communications mode.

14. The method of claim 11, further comprising:
during the first data communications mode, selectively activating a first capacitor coupled to a first end of the wireless power receiving coil; and
during the second data communications mode, selectively activating a second capacitor coupled to the first end of the wireless power receiving coil, wherein the first and second capacitors have different capacitance values.

15. The method of claim 14, further comprising:
with rectifier circuitry in the wireless power receiving device, receiving the wireless power signals from the wireless power receiving coil;
configuring the rectifier circuitry as a full-bridge rectifier during the first data communications mode; and
configuring the rectifier circuitry as a half-bridge rectifier during the second data communications mode.

16. A wireless power receiving device comprising:
a coil with a first terminal and a second terminal;
rectifier circuitry coupled to the first and second terminals of the coil;
a first passive component coupled to the first terminal of the coil, wherein the first passive component is selectively activated during a first data transmission mode, and wherein the first passive component is configured to provide a first amount of impedance change at the coil; and
a second passive component coupled to the first terminal of the coil, wherein the second passive component is selectively activated during a second data transmission mode, and wherein the second passive component is configured to provide a second amount of impedance change at the coil that is different than the first amount of impedance change.

17. The wireless power receiving device of claim 16, wherein the first and second passive components comprise electrical components selected from the group consisting of: capacitors and resistors.

18. The wireless power receiving device of claim 16, wherein the rectifier circuitry is configured as a full-bridge rectifier in the first data transmission mode and is configured as a half-bridge rectifier in the second data transmission mode.

19. The wireless power receiving device of claim 18, wherein the rectifier circuitry comprises:
first and second diodes coupled to the first terminal of the coil;
third and fourth diodes coupled to the second terminal of the coil, wherein the fourth diode is shorted out during the second data transmission mode.

20. The wireless power receiving device of claim 16, further comprising:
a first switch coupled in series with the first passive component;
a second switch coupled in series with the second passive component; and
control circuitry configured to generate a first control signal for modulating the first switch during the first data transmission mode and to generate a second control signal for modulating the second switch during the second data transmission mode.

21. A wireless power receiving device configured to receive wireless power signals from a wireless power transmitting device, the wireless power receiving device comprising:
a coil;
wireless power receiving circuitry coupled to the coil and configured to receive the wireless power signals from the coil;
an adjustable load bank coupled to the coil; and
control circuitry operable to:
configure the wireless power receiving device in a first data communications mode by activating at least a first portion of the adjustable load bank; and
configure the wireless power receiving device in a second data communications mode that is different than the first data communications mode by activating at least a second portion of the adjustable load bank.

22. The wireless power receiving device of claim 21, wherein the control circuitry is configured to dynamically adjust the adjustable load bank to ensure that adequate signal strength is maintained between the wireless power receiving device and the wireless power transmitting device.

23. The wireless power receiving device of claim 21, wherein the power receiving device further comprises rectifier circuitry connected to the coil, and wherein the control circuitry is further configured to adjust the adjustable load bank at least partially based on a rectified voltage output from the rectifier circuitry.

24. The wireless power receiving device of claim 23, wherein the rectifier circuitry is operable in a full-bridge rectifier mode and in a half-bridge rectifier mode.

25. The wireless power receiving device of claim 23, wherein the rectifier circuitry is coupled between the coil and the adjustable load bank.

26. The wireless power receiving device of claim 21, wherein the power receiving device further comprises an output load coupled to the coil, and wherein the control circuitry is further configured to adjust the adjustable load bank at least partially based on the size of the output load.

27. The wireless power receiving device of claim 21, wherein the wireless power transmitting device is of a given transmitter type and operates using a given communications protocol, wherein information about the given transmitter type or the given communications protocol is conveyed from the wireless power transmitting device to the control circuitry during handshaking operations, and wherein the control circuitry is further configured to adjust the adjustable load bank at least partially based on the information conveyed during the handshaking operations.

28. The wireless power receiving device of claim 21, wherein the adjustable load bank comprises an array of individually selectable components selected from the group consisting of: capacitors, resistors, constant current loads, and ballast loads.

* * * * *

UNITED STATES PATENT AND TRADEMARK OFFICE
CERTIFICATE OF CORRECTION

PATENT NO. : 10,811,913 B2
APPLICATION NO. : 16/196975
DATED : October 20, 2020
INVENTOR(S) : Weihong Qui et al.

Page 1 of 1

It is certified that error appears in the above-identified patent and that said Letters Patent is hereby corrected as shown below:

In the Claims

Column 19, Line 7, in Claim 6, "coupling s greater" should read -- coupling is greater --

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*